Aug. 24, 1948.   J. W. HARRISON   2,447,649
ELECTRIC HEATING APPARATUS AND CONTROL
Filed Sept. 24, 1942   2 Sheets-Sheet 1
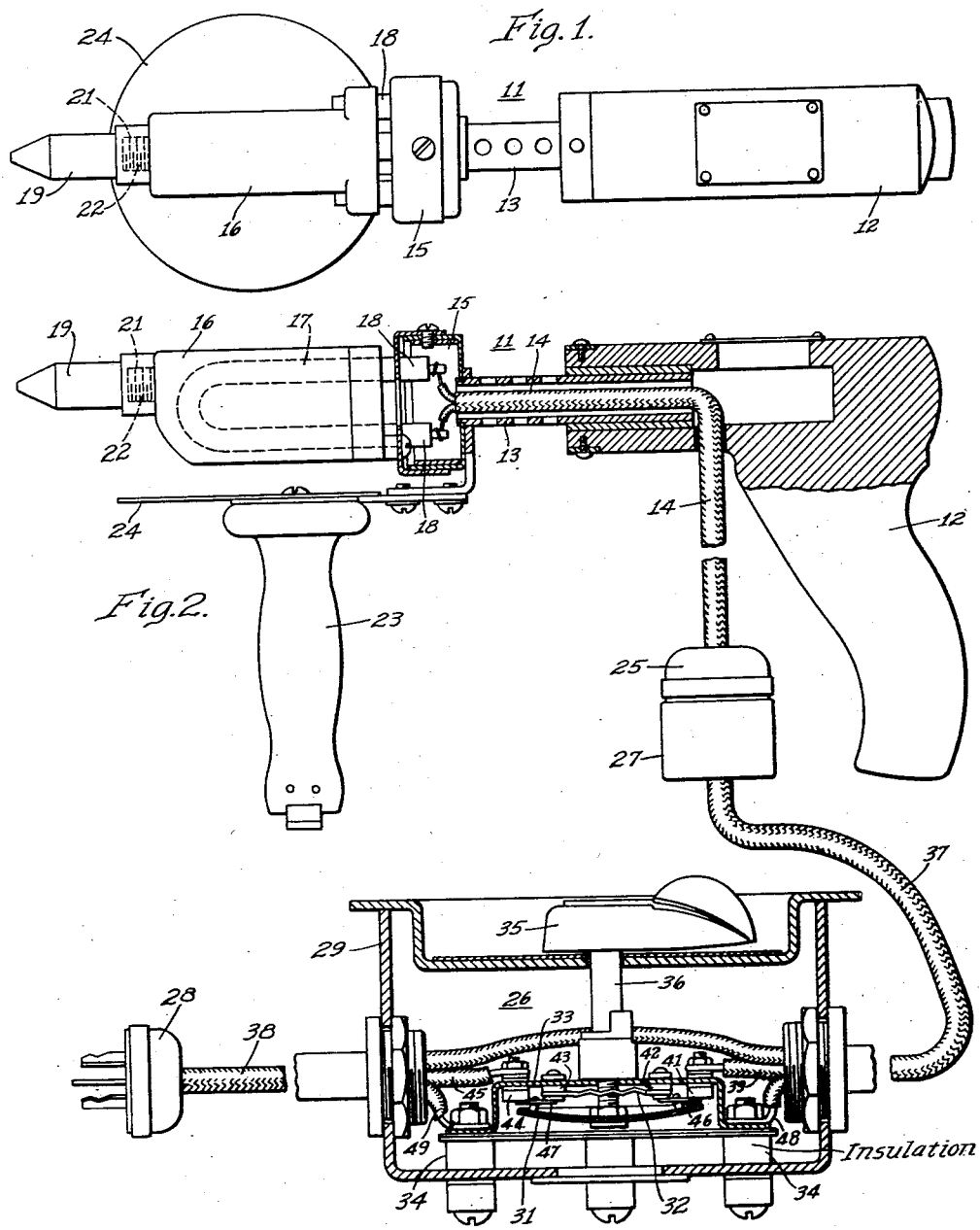
WITNESSES:
C. J. Weller.
INVENTOR
John W. Harrison.
BY
W. R. Coley
ATTORNEY Aug. 24, 1948.   J. W. HARRISON   2,447,649
ELECTRIC HEATING APPARATUS AND CONTROL
Filed Sept. 24, 1942   2 Sheets-Sheet 2
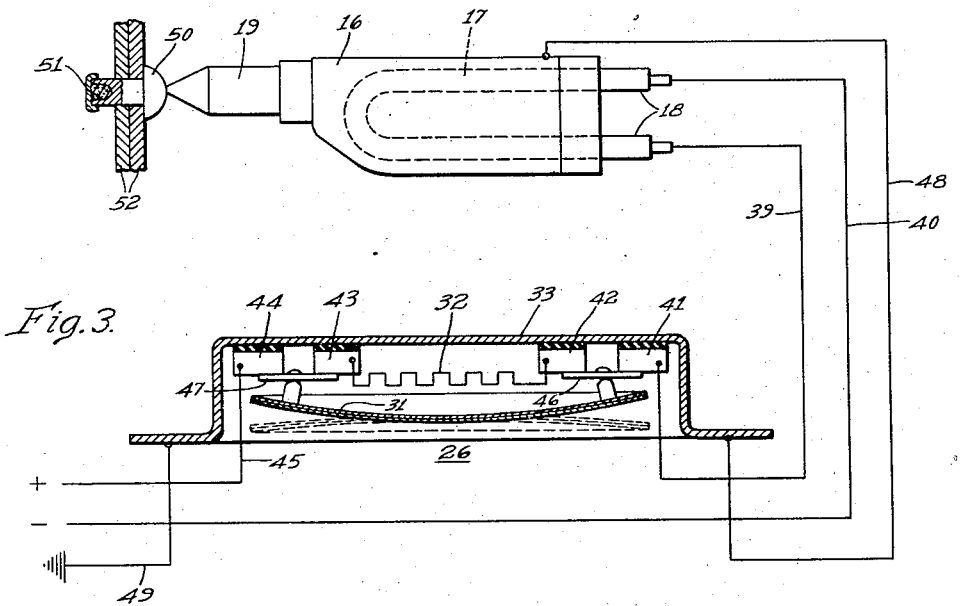
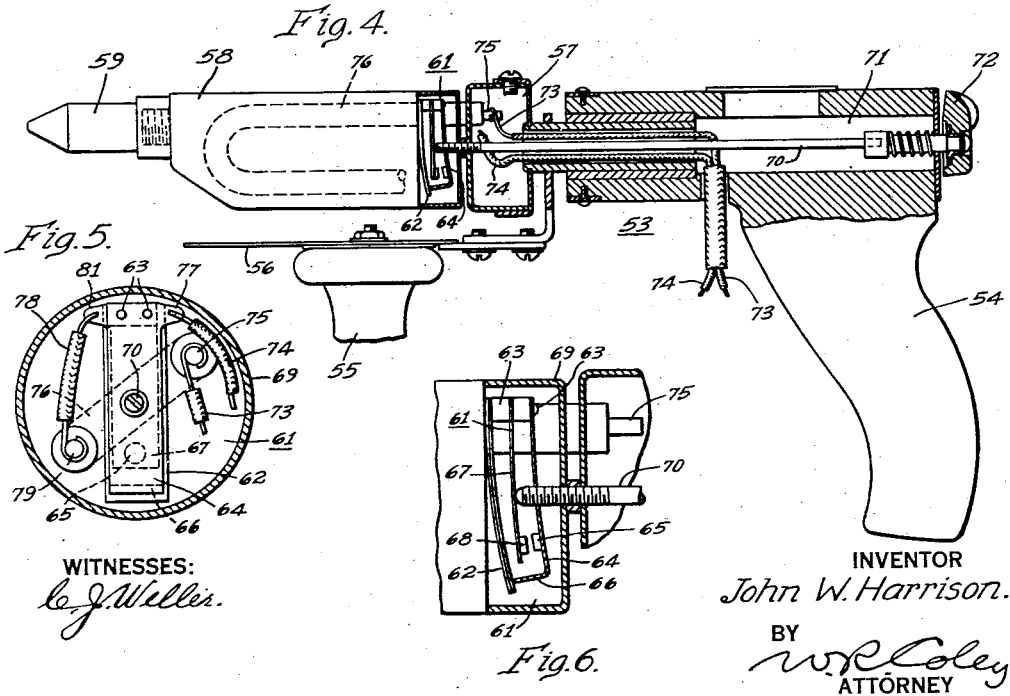
WITNESSES:
INVENTOR
John W. Harrison.
BY
ATTORNEY Patented Aug. 24, 1948

2,447,649

UNITED STATES PATENT OFFICE 2,447,649

ELECTRIC HEATING APPARATUS AND CONTROL

John W. Harrison, Mansfield, Ohio, assignor to Westinghouse Electric Corporation, East Pittsburgh, Pa., a corporation of Pennsylvania Application September 24, 1942, Serial No. 459,482

4 Claims. (Cl. 219—21)

My invention relates to electric heating apparatus and controls therefor and particularly to an electrically-heated tool and adjustable means for controlling the temperature of said tool.

More specifically, my invention relates to an electrically-heated tool for heating explosive rivets which are used, for example, in airplane construction and in locations where it is difficult to use a bucking tool for driving standard rivets. However, the tool may be used for other purposes, such as soldering and the like.

In a tool for heating explosive rivets, relatively high temperatures of between 900° F. and 1200° F. are required to fire the explosive contained in the rivets. Although the amount of heat necessary to fire each rivet is relatively small, it is desirable to heat a large mass of metal to the desired temperature so that continuous riveting may be accomplished without appreciable temperature change in the tool. A large mass of metal has sufficient heat storage capacity to effect this result and the amount of heat absorbed by the rivets is relatively small compared with the heat loss from the tool by radiation. It is, therefore, possible to control the temperature of the large mass of metal either by controlling the wattage input to the heating element or by thermostatically controlling the heating element. The wattage control has the advantage that the control device may be at a remote location from the hot parts of the tool, so that contact burning does not occur, while the thermostatic control has the advantage of compactness and somewhat closer control of the operating temperature of the device.

It is, therefore, an object of my invention, to provide an improved electrically-heated tool of the type wherein a large mass of metal is maintained at a substantially constant elevated temperature.

It is another object of my invention to provide a novel wattage input control for an electrically-heated tool, and further to provide a readily accessible adjustment for the control.

It is a further object of my invention to provide an improved wattage control for an electrically-heated tool wherein the control is of the bimetal type.

It is still another object of my invention to provide a control for an electrically-heated tool which is at a remote location from the hot parts of the tool.

It is a further object of my invention to provide an improved thermostatic control for an electrically heated tool and further to provide a bimetal temperature control element which is in metallic heat conducting relation with the part of the tool to which heat is directly applied.

It is still a further object of my invention to provide an improved thermostatic control for an electrically-heated tool and to provide for readily accessible adjustment of the thermostatic control.

It is also an important object of my invention to provide a novel electrically-heated tool and control therefor for riveting with explosive rivets.

These and other objects of my invention will become evident from the following description, taken in conjunction with the accompanying drawings, in which:

Figure 1 is a top view of an electrically-heated tool constructed in accordance with a preferred embodiment of my invention;

Fig. 2 is a side view, partially in section, of the tool shown in Fig. 1, with a wattage control device also shown in section;

Fig. 3 is a wiring diagram for the tool and control shown in Figs. 1 and 2;

Fig. 4 is a side view, partially in section, of a second embodiment of my invention;

Fig. 5 is an enlarged top view of the thermostat used in Fig. 4, showing the electrical connections; and Fig. 6 is an enlarged sectional view of the thermostat used in Fig. 4.

Referring specifically to Figures 1, 2 and 3 of the drawings for a detailed description of the first embodiment of my invention, numeral 11 designates generally an electrically-heated tool for explosive riveting. The tool 11 includes a handle 12, a tube 13 containing an electric cable 14, a junction box 15 attached to tube 13 and a head 16 formed of a large mass of metal. An electrical heating element 17, preferably of the rod type, is embedded in the head 16 and is provided with terminals 18 which support the head 16 from the junction box 15. A working tip 19, having female threads 21 therein, is attached to male threads 22 on the head 16, so that intimate metallic engagement is effected between the two and the temperature of the head 16 and tip 21 will be substantially the same. A second handle 23 and a heat shield 24 are also supported from the junction box 15. The electric cable 14 is provided with an electrical connecting plug 25.

As best shown in Fig. 2, an adjustable wattage control device, generally indicated at 26, is electrically connected to the tool 11 by an electrical socket 27 which is engaged by plug 25 and is connected to a source of power (not shown) by an electrical plug 28. The adjustable wattage control device 26 comprises a metal casing 29 enclosing a snap-acting bimetal element 31, for example, of the Spencer disc type, a heater 32 in heat exchange relation with the bimetal element 31 and a second metal casing 33 enclosing the bimetal element 31 and heater 32. The casing 33 is supported on insulating studs 34 and an adjusting knob 35, accessible from the top of the casing 29, is attached to a threaded shaft 36. The threaded shaft 36 extends through both the casings 29 and 33 and varies the bias of the bimetal element 31, thereby changing the temperature at which it snaps from one position to the other. As the adjusting knob 35 and shaft 36 are rotated in one direction, the end of the threaded shaft depresses the center of the bimetal element 31 so that a higher temperature is required to snap it to the open position. Therefore, the input to the heating element 17 is increased and the head 16 and tip 19 are maintained at a higher temperature. As the knob 35 and shaft 36 are rotated in the opposite direction, the center of the bimetal element 31 is raised, and the head 16 and tip 19 operate at a lower temperature. An electrical cord 37 connects socket 27 to the wattage control device 26 and an electrical cord 38 connects the wattage control device 26 with plug 28.

As best shown in Fig. 3, the heating element 17 is supplied with electrical energy through conductors 39 and 40, the conductor 39 being connected to a fixed contact 41 of the wattage control device 26 and the conductor 40 connecting with one side of the source of power. The wattage control device is provided with three additional fixed contacts 42, 43 and 44. The electric heater 32 is connected between contacts 42 and 43 and a conductor 45 connects the contact 44 to the other side of the source of power. The snap-acting bimetal element is provided with a plurality of moving contacts 46 and 47 each of which bridges a pair of the fixed contacts, namely, contacts 41 and 42 and contacts 43 and 44, respectively. A ground or neutral conductor 48 extends between the head 16 and the casing 33 and a second neutral conductor 49 extends between the casing 33 and ground, thus preventing any possibility of a shock from head 16 or casing 33 or 29.

As shown in Fig. 3, the working tip 19 is pressed against the head of a rivet 50 containing an explosive charge 51 in its shank. When the heat from the tip 19 explodes the charge 51, the shank of the rivet spreads and rivets two pieces of metal 52 together.

In operation, where the tool 11 and wattage control device 26 are connected to a source of power, the bimetal element 31 starts a cycle in the position shown in Fig. 3 with movable contacts 46 and 47 bridging fixed contacts 41, 42 and 43, 44, respectively. Current, therefore, flows through conductor 40, heating element 17 and back to contact 41 through conductor 39. Current then flows across movable contact 46 to terminal 42, through thermostat heater 32 to fixed contact 43, across movable contact 47 to fixed contact 44 and then back to the source of power through conductor 45. Both the main heater 17 and thermostat heater 32 are energized, and assuming that the head 16 and tip 19 have already been elevated to near the desired riveting temperature, heat will be supplied to them in sufficient quantities to overcome the relatively large heat radiation losses and the relatively small heat losses due to contact of the tip 19 with rivets 50. As the thermostat heater receives energy, it heats the bimetal element 31 to a temperature depending on the setting of knob 35. When such a temperature is attained, the bimetal element snaps to the position shown in dotted lines in Fig. 3 and opens the contacts, thereby deenergizing both the thermostat heater 32 and main heater 17. The bimetal element then cools by radiation until it reaches a temperature where it again snaps to the position shown in Fig. 2, thus again energizing the thermostat heater 32 and the main heater 17. The wattage input to the heater 17 is, therefore, constant for a particular setting of the knob 35 and is sufficient to overcome the heat losses due to radiation and riveting. Since the radiation loss is the major heat loss and since the head 16 and tip 19 have large heat storage capacity, a constant wattage control is satisfactory to maintain a substantially constant temperature of the head 16 and tip 19.

It is, therefore, apparent that I have provided a novel electrically-heated tool and wattage control therefor wherein the temperature of the heated parts of the tool are maintained at a substantially constant high temperature and wherein the controlling device is in a remote location where its parts are not affected by the high temperature portions of the tool. Furthermore, the device is self-compensating for a fairly wide range of voltage variations because the thermostat heater and main heater are connected in series and voltage changes affect the heat generated by both heaters to the same degree.

Referring now to Figs. 4 to 6, inclusive, for a detailed description of the second embodiment of my invention, numeral 53 designates generally an electrically-heated tool having handles 54 and 55, a heat shield 56, a junction box 57, a head 58 and a working tip 59, assembled much in the same manner as the tool shown in Figs. 1 to 3, inclusive.

In this embodiment of my invention, an adjustable thermostat, generally indicated at 61 is associated with the head 58 to control the temperature thereof. The thermostat 61 comprises a creep-acting bimetal element 62 held in metallic contact with the head 58 by insulating studs 63. Also mounted on the studs 63 is a spring arm 64 carrying a movable contact 65 and having a leg 66 extending toward the free end of the bimetal element 62 for engagement therewith. A lower spring arm 67 is also mounted on the studs 63 and carries an adjustable contact 68. A casing 69 encloses the thermostat 61 and a threaded shaft 70 extends through the casing 69, the junction box 57 and through a passage 71 in the handle 54. An adjusting knob 72 is provided on the end of the shaft 70 in a readily accessible position at the back of handle 54.

As the threaded shaft 70 is turned, its end bears on the spring arm 67 and changes the position of the adjustable contact 68, thereby changing the temperature at which the bimetal element opens and closes contacts 65 and 68. As adjusting knob 72 and the threaded shaft 70 are turned in one direction, the end of the shaft 70 depresses the arm 67, thereby lowering the temperature at which the bimetal element 62 opens the contacts 65, 68, to reduce the operating temperature of the head 58 and tip 59. When the knob 72 and shaft 71 are turned in the opposite direction, the arm 67 raises and the temperature of head 58 and tip 59 is increased.

A conductor 73 connects one terminal 75 of a heating element 76 to a source of power (not shown). A conductor 74 is connected to the source of power and to an ear 77 on the upper spring arm 64 which carries one contact 65. A conductor 78 connects a second terminal 79 of the heating element 76 to an ear 81 of the lower spring arm 67 which carries the contact 68. As shown in Figs. 4 and 6, the head 58 is hot and the bimetal element 62 has flexed to the position shown to open the contacts 65 and 68. As the head 58 and, therefore, the bimetal element 62 cool, the bimetal element flexes toward the head 58 and lowers the spring arm 64 and contact 65 until contacts 65 and 68 engage and energize the heater 76 through the circuit just described. Due to the fact that the bimetal element 62 is in direct metallic engagement with the head 58, very close control of the temperature of the head 58 and working tip 59 is effected.

From the foregoing it will be apparent that I have provided an electrically-heated tool which is readily adjustable to various operating temperatures and a thermostatic control which maintains the desired temperature within very narrow limits.

I do not wish to be restricted to the specific structural details, circuit connections or relations of parts hereinbefore set forth, as further modifications thereof may be effected without departing from the spirit and scope of my invention. I desire, therefore, that only such limitations shall be imposed thereon as are indicated in the appended claims.

I claim as my invention:

1. In an electrically-heated tool for heating metallic materials, the combination of an elongated working head comprising a heavy mass of metal for storing large quantities of heat, an electric heating element for heating said working head to a substantially uniform temperature throughout, said working head having a front end portion for applying heat to said material and a cup-shaped supporting member at the rear end of the head, an electrical circuit connecting said heating element to a source of power and a pair of terminals in said electric circuit; a bimetal thermostat control element in intimate contact with the rear portion of said working head and located between the working head and said supporting member, said thermostatic element operating, with temperature variations, to open and close said pair of terminals in the electric circuit to control the temperature of said working head; a handle having a portion extending in substantial alignment with said working head, said handle having a finger grip at the rear portion and a cup-shaped supporting member at the front end; said first-mentioned cup-shaped member being connected with the second-mentioned cup-shaped member by telescoping the two members together, and means to lock the members in telescoped relation, whereby said elongated working head is assembled in working relation with said handle, with a heat insulating chamber therebetween to stop excessive heat flow from the working head to the handle.

2. In an electrically heated tool for heating metallic materials, the combination of an elongated working head comprising a heavy mass of metal for storing large quantities of heat, an electric heating element for heating said working head to a substantially uniform temperature throughout, said working head having a front end portion for applying heat to said material and a cup-shaped supporting member at the rear end of the head, and terminals for said electric heating element inside the cup-shaped supporting member; a handle having a portion extending in substantial alignment with said working head, said handle having a finger grip at the rear portion and a cup-shaped supporting member at the front end; said first-mentioned cup-shaped member being connected with the second-mentioned cup-shaped member by telescoping the two members together, and means to lock the members in telescoped relation, and an electric circuit extending through one of said cup-shaped members, connected to said terminals and to a source of power, whereby said working head and said handle are connected in working relation, with the heat conducting parts of said working head made discontinuous at the heat radiating chamber to stop excessive heat flow from the working head to the handle.

3. In an electrically-heated tool for heating metallic materials, the combination of an elongated working head comprising a heavy mass of metal for storing large quantities of heat, an electric heating element for heating said working head to a substantially uniform temperature throughout, said working head having a front end portion for applying heat to said material and a cup-shaped supporting member at the rear end of the head, control means for maintaining said working head at substantially constant temperature comprising a bimetal thermostatic element attached to the rear end portion of said working head and contact means arranged to be opened and closed by said thermostat element, a casing located between said working head and the cup-shaped supporting member, enclosing said thermostat and contacts and means connecting said heating element and contacts in series and to two electric terminals, at least one of which is located in said cup-shaped supporting member, a handle having a portion extending in substantial alignment with said working head, said handle having a finger grip at the rear portion and a cup-shaped supporting member at the front end; said first-mentioned cup-shaped member being connected with the second-mentioned cup-shaped member by telescoping the two members together and means to lock the members in telescoped relation; means extending through said handle and said cup-shaped support for adjusting the position of the thermostatic element, and an electric circuit extending through one of said cup-shaped members, connected to said terminals and to a source of power, whereby said working head and said handle are connected in working relation, with the heat conducting parts of said working head made discontinuous at the heat radiating chamber to stop excessive heat flow from the working head to the handle.

4. In an electrically-heated tool for heating metallic materials, the combination of an elongated working head comprising a heavy mass of metal for storing large quantities of heat, an electric heating element for heating said working head to a substantially uniform temperature throughout, leads for said heating element projecting to the rear of and in axial alignment with said working head, said working head having a front end portion for applying heat to said material and a cup-shaped supporting member mounted on said leads at the rear end of the head and terminals for said leads inside the cup-shaped supporting member, a handle having a portion extending in substantial alignment with said working head, said handle having a finger grip at the rear portion and a cup-shaped supporting member at the front end; said first-mentioned cup-shaped member being connected with the second-mentioned cup-shaped member by telescoping the two members together, and means to lock the members in telescoped relation, and an electrical circuit connecting said terminals to a source of power, whereby said elongated working head is assembled in working relation with said handle with the working head and heating element leads terminating at a heat insulating chamber to stop excessive heat flow from the working head to the handle.

JOHN W. HARRISON.

REFERENCES CITED

The following references are of record in the file of this patent:

UNITED STATES PATENTS

| Number | Name | Date |
|---|---|---|
| 620,306 | Hadaway | Feb. 28, 1899 |
| 915,974 | Leonard | Mar. 23, 1909 |
| 1,619,817 | Gibson | Mar. 8, 1927 |
| 1,675,401 | Alferink | July 3, 1928 |
| 1,742,558 | Randolph | Jan. 7, 1930 |
| 1,971,970 | Walder | Aug. 28, 1934 |
| 2,070,604 | Kuhn et al. | Feb. 16, 1937 |
| 2,101,445 | Moore | Dec. 7, 1937 |
| 2,159,869 | Thomas et al. | Mar. 23, 1939 |
| 2,182,048 | Elmer | Dec. 5, 1939 |
| 2,185,197 | Heinrich | Jan. 2, 1940 |
| 2,192,655 | Smith | Mar. 5, 1940 |
| 2,295,075 | Burrows et al. | Sept. 8, 1942 |
| 2,341,831 | Vanatta | Feb. 15, 1944 |